United States Patent
Nakajima (10) Patent No.: US 9,328,791 B2
(45) Date of Patent: May 3, 2016

(54) VARIABLE DAMPING FORCE DAMPER

(75) Inventor: Kiyoshi Nakajima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/240,126

(22) PCT Filed: Aug. 27, 2012

(86) PCT No.: PCT/JP2012/005360
§ 371 (c)(1),
(2), (4) Date: Feb. 21, 2014

(87) PCT Pub. No.: WO2013/031170
PCT Pub. Date: Mar. 7, 2013

(65) Prior Publication Data
US 2014/0182986 A1    Jul. 3, 2014

(30) Foreign Application Priority Data

Aug. 29, 2011    (JP) ................. 2011-186463

(51) Int. Cl.
| | |
|---|---|
| *F16F 9/44* | (2006.01) |
| *F16F 9/348* | (2006.01) |
| *B60G 17/08* | (2006.01) |
| *F16F 9/22* | (2006.01) |
| *F16F 9/53* | (2006.01) |

(52) U.S. Cl.
CPC ............. *F16F 9/3484* (2013.01); *B60G 17/08* (2013.01); *F16F 9/22* (2013.01); *F16F 9/535* (2013.01)

(58) Field of Classification Search
CPC .......... F16F 9/50; F16F 9/464; F16F 9/3485; F16F 9/3484; F16F 9/3488; B60G 2500/10; F16K 31/0682
See application file for complete search history.

(56) References Cited

U.S. PATENT DOCUMENTS

| | | | | |
|---|---|---|---|---|
| 4,660,686 | A | * | 4/1987 | Munning et al. ............... 188/280 |
| 2007/0193839 | A1 | * | 8/2007 | Nakajima et al. .......... 188/267.2 |
| 2008/0277217 | A1 | | 11/2008 | Nakajima et al. |

FOREIGN PATENT DOCUMENTS

| | | |
|---|---|---|
| EP | 1 990 557 A2 | 11/2008 |
| JP | S58-35031 U | 3/1983 |
| JP | 2006-342955 A | 12/2006 |
| JP | 2008196674 A * | 8/2008 |
| JP | 2008-275126 A | 11/2008 |
| JP | 4599422 B2 | 12/2010 |
| JP | 2011208721 A * | 10/2011 |

* cited by examiner

*Primary Examiner* — Anna Momper
*Assistant Examiner* — Stephen Bowes
(74) *Attorney, Agent, or Firm* — Carrier Blackman & Associates, P.C.; Joseph P. Carrier; Jeffrey T. Gedeon (57) ABSTRACT

Provided is a solenoid-type variable damping force damper that improves the strength of the piston and prevents wire break in the electromagnetic coil. A piston includes a piston main body, an expansion-side valve plate, a contraction-side valve plate, an electromagnetic coil, and a bolt. The piston main body is an integrally formed component made of a ferromagnetic material, and includes a hollow cylindrical outer yoke that is in slidable contact with an inner peripheral surface of a cylinder, a columnar inner yoke having an outer peripheral surface opposing an inner peripheral surface of the outer yoke via first and second gaps, and a connection member connecting the outer yoke and the inner yoke with each other at an axially middle position of the piston and separating the first and second gaps from each other. The electromagnetic coil is fitted in the second gap of the piston main body.

4 Claims, 10 Drawing Sheets

VARIABLE DAMPING FORCE DAMPER

TECHNICAL FIELD

The present invention relates to a solenoid-type variable damping force damper for use in a suspension of an automobile, and particularly relates to technology for improving the strength of a piston and preventing wire break in an electromagnetic coil.

BACKGROUND OF THE INVENTION

A suspension is an important element that significantly affects the driving stability of an automobile, and typically includes, as main components thereof, a link (such as an arm, rod, etc.) that supports a wheel to be movable vertically relative to a vehicle body, a spring that is flexible to absorb impact from a road surface or the like, and a damper for damping the oscillation of the spring. Such a damper for an automotive suspension is typically embodied as a tubular damper which includes a hollow cylinder filled with hydraulic oil, a piston configured to slide in the cylinder in an axial direction, and a piston rod having an end connected with the piston, where the hydraulic oil is caused to move between multiple oil chambers in response to movement of the piston. Such a tubular damper may be of a multi-tube type or a mono-tube type.

In the tubular dampers, the piston is typically provided with a communication oil passage and a flexible valve plate, such that the valve plate provides a flow resistance to the hydraulic oil moving between the oil chambers through the communication oil passage, thereby generating a damping force. However, such a damper has constant damping characteristics, and therefore, it cannot provide a ride quality and driving stability appropriate for the road surface condition and riding circumstances. To address such a problem, there is proposed a variable damping force damper in which contraction-side and expansion-side valve plates, each made of a magnetic material, are provided on upper and lower surfaces of a piston main body, respectively, and an annular electromagnetic coil for generating a magnetic field is disposed between an outer yoke and an inner yoke that constitute the piston main body, such that the strength of the magnetic field can be varied by controlling the amount of electric current supplied to the electromagnetic coil, whereby the valve opening characteristics of the valve plates (namely, damping force) can be varied continuously (see Patent Documents 1 and 2, for example).

PRIOR ART DOCUMENT(S)

Patent Document(s)

Patent Document 1: JP4599422B
Patent Document 2: JP2006-342955A

BRIEF SUMMARY OF THE INVENTION

Task to be Accomplished by the Invention

In the variable damping force dampers disclosed in Patent Documents 1 and 2, since the electromagnetic coil is disposed between the inner yoke and the outer yoke, the mechanical strength of the piston main body is reduced, and this may cause the following problems. In a McPherson strut type suspension, for example, when the vehicle is traveling on a rough road or makes a turn, a large lateral force or a bending force may be applied to the damper, causing the piston supported by the piston rod to be pressed against the inner wall surface of the cylinder. This may cause deformation of the electromagnetic coil, such that the axis of the outer yoke is offset from the axis of the inner yoke, resulting in a slight misalignment between the axis of the cylinder and the axis of the piston main body. This may hinder a smooth telescopic action of the damper and cause a seal, which is provided in a cylinder end portion such that the piston rod is in slidable contact therewith, to be worn out in a relatively short period of time. Further, since frequent compressive deformation of the electromagnetic coil tends to cause wire break or the like, the durability of the damper may be reduced.

The present invention is made in view of the foregoing background, and an object of the present invention is to provide a solenoid-type variable damping force damper that can improve the strength of the piston and prevent wire break in the electromagnetic coil.

Means to Accomplish the Task

In a first aspect of the present invention, there is provided a variable damping force damper including: a hollow cylinder (12) containing hydraulic oil sealed therein; a columnar piston (16) configured to reciprocate in the cylinder and separate an interior of the cylinder into a rod-side oil chamber (14) and a piston-side oil chamber (15); and a piston rod (13) having the piston at an end thereof, wherein the piston includes: an inner yoke (34) made of a ferromagnetic material, the inner yoke being secured to the piston rod and having an outer peripheral surface coaxial with the cylinder; an outer yoke (31) made of a ferromagnetic material, the outer yoke having an inner peripheral surface coaxial with the outer peripheral surface of the inner yoke and opposing the outer peripheral surface of the inner yoke via a predetermined gap; an electromagnetic coil (43) disposed in the gap; a communication oil passage (38, 39) having an opening in at least one of axial ends and connecting the rod-side oil chamber and the piston-side oil chamber with each other; and a valve plate (41, 42) configured to have elasticity and close the opening of the communication oil passage, the valve plate being made of a ferromagnetic material and attracted in a closing direction by a magnetic force of the electromagnetic coil, wherein the inner yoke and the outer yoke are connected with each other by a metallic connection means (35, 61, 62) at a position different from that of the electromagnetic coil in an axial direction.

In a second aspect of the present invention, the piston is provided with a pair of communication oil passages, one having an opening in one axial end and the other having an opening in an opposite axial end, and the valve plate is provided to each of the openings of the pair of communication oil passages.

In a third aspect of the present invention, the electromagnetic coil is offset toward one of the valve plates relative to an axially middle position between the valve plates.

In a fourth aspect of the present invention, the connection means consists of a connection member (35) made of a ferromagnetic material integrally with the inner yoke and the outer yoke.

In a fifth aspect of the present invention, the connection member is configured to have an axial size smaller than a thickness of the valve plate.

In a sixth aspect of the present invention, the connection means consists of a connection member (61, 62) made of a non-magnetic material.

In a seventh aspect of the present invention, a piston ring (45) is fitted on the outer yoke so as to be in slidable contact with the inner peripheral surface of the cylinder; and the connection means is disposed at a position spaced from the piston ring in the axial direction.

Effect of the Invention

According to the present invention, since the outer yoke and the inner yoke are connected with each other by the metallic connection means, the electromagnetic coil is prevented from deforming easily even when the piston is strongly pressed against the inner wall surface of the cylinder. Thus, displacement between the axis of the cylinder and the axis of the piston is restrained, wear of the seal is suppressed, and wire break or the like in the electromagnetic coil becomes less likely to occur. In the structure in which the piston is provided with a pair of communication oil passages, one having an opening in one axial end and the other having an opening in an opposite axial end, and the valve plate is provided to each of the openings of the pair of communication oil passages, damping forces on the expansion side and the contraction side can be variably controlled by a single electromagnetic coil. In the structure in which the electromagnetic coil is offset toward one of the valve plates relative to an axially middle position between the valve plates, it is possible, for example, to make the damping force on the expansion side larger than the damping force on the contraction side. In the structure in which the connection means consists of a connection member made of a ferromagnetic material integrally with the inner yoke and the outer yoke, the number of components and the number of assembly steps can be reduced. In the structure in which the connection member is configured to have an axial size smaller than a thickness of the valve plate, the magnetic flux flowing through the connection member is reduced, and thus, a relatively large magnetic force can be obtained on each side of the electromagnetic coil. In the structure in which the connection means consists of a connection member made of a non-magnetic material, magnetic flux does not flow through the connection member, and thus, it is possible to increase the axial size of the connection member, thereby restraining relative displacement between the inner yoke and the outer yoke more effectively. Further, in the structure in which the connection means is disposed at a position spaced from the piston ring in an axial direction, bending, rotation and twisting of the piston can be suppressed effectively.

DETAILED DESCRIPTION OF THE PREFERRED EMBODIMENT(S)

In the following, detailed description will be made of an exemplary embodiment, in which the present invention is applied to a mono-tube variable damping force damper constituting a front suspension of an automobile, with reference to the drawings. It is to be noted that with regard to the members and positional relationships in the exemplary embodiment, description will be made on the assumption that the upward direction in FIG. 2 indicates the "upward" direction.

Figure 1:
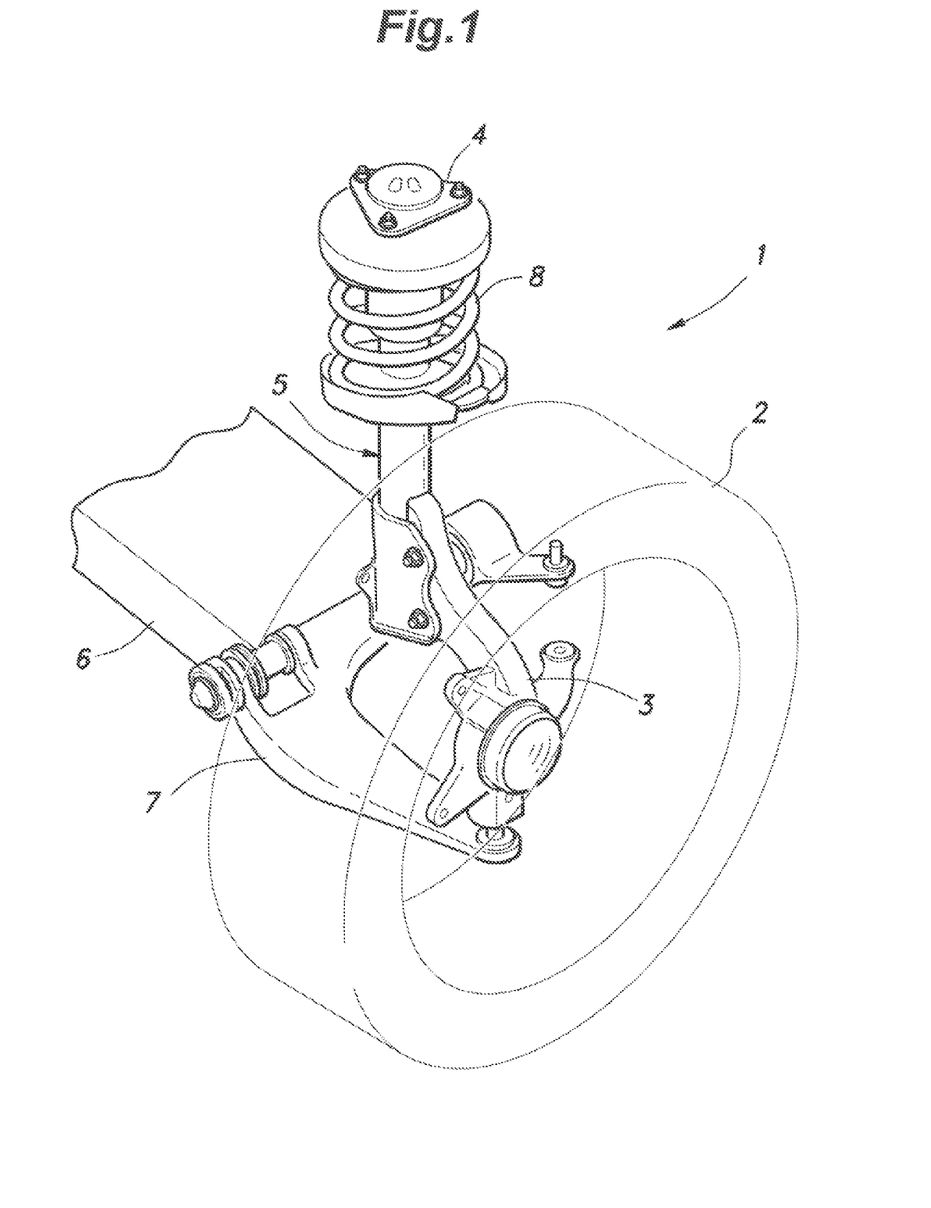
FIG. 1 is a perspective view showing a front suspension for an automobile according to an exemplary embodiment of the present invention.

<<Structure of the Exemplary Embodiment>>
<Suspension>
As shown in FIG. 1, a front suspension 1 in the exemplary embodiment is of a so-called McPherson strut type, and includes, as main components thereof, a steering knuckle 3 (wheel-side member) rotatably supporting a wheel 2, a strut damper (hereinafter, simply referred to as a damper) 5 having upper and lower ends connected with a damper mount 4 (vehicle body-side member) and the steering knuckle 3, respectively, a lower arm 7 having left and right ends connected with a suspension member 6 and the steering knuckle 3, respectively, and spring 8 fitted over an upper part of the damper 5.

Figure 2:
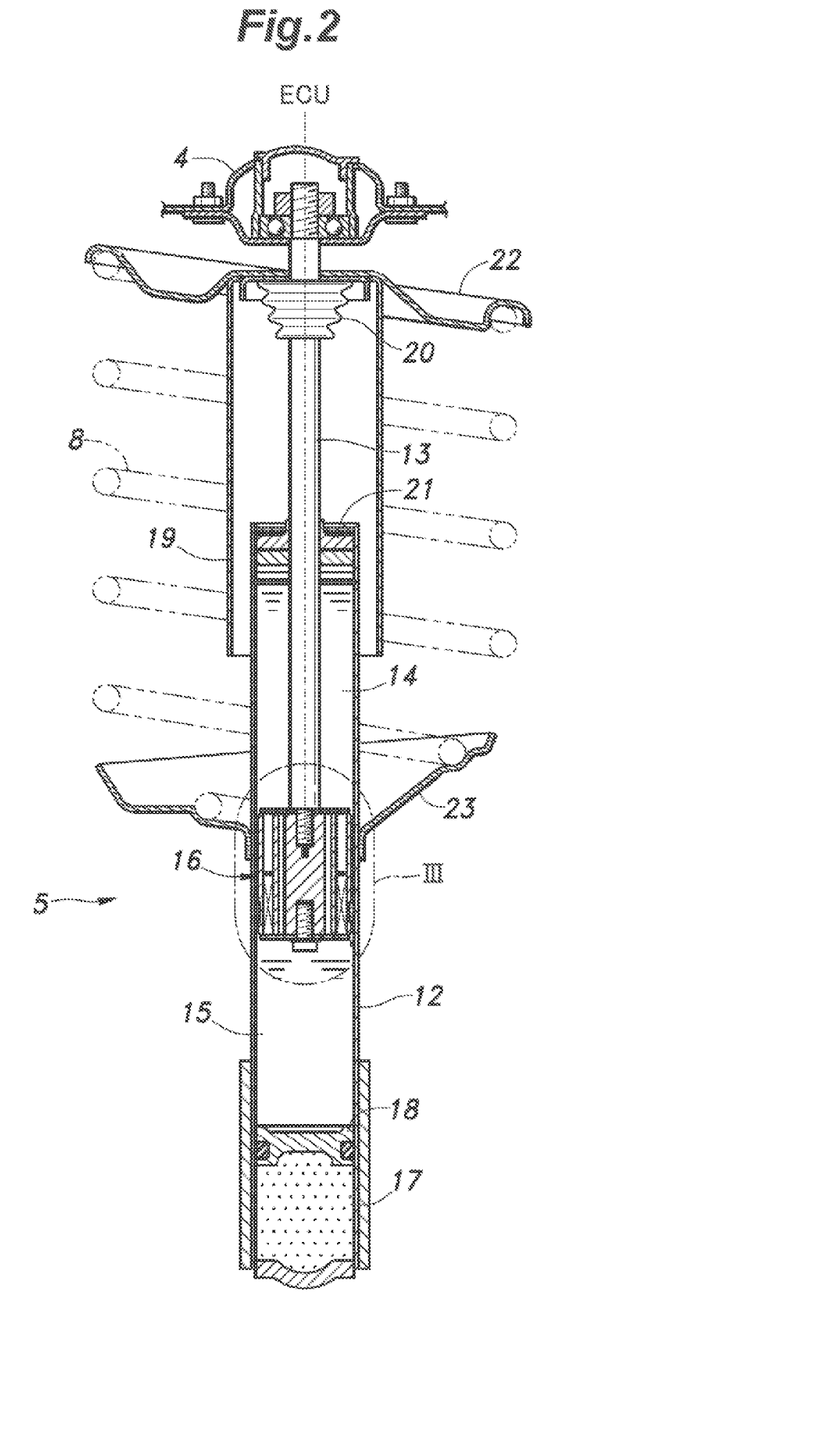
FIG. 2 is a longitudinal cross-sectional view of a variable damping force damper according to the exemplary embodiment.

<Damper>
As shown in FIG. 2, the damper 5 in the exemplary embodiment is of a mono-tube type (De Carbon type), and includes a hollow cylinder 12 filled with hydraulic oil and having a lower portion connected with the steering knuckle 3, a piston rod 13 having an upper end connected with the damper mount 4 and being slidable relative to the cylinder 12 in an axial direction, a piston 16 mounted at an end of the piston rod 13 and separating the interior of the cylinder 12 into a rod-side oil chamber 14 and a piston-side oil chamber 15, a free piston 18 defining a high pressure gas chamber 17 in a lower part of the cylinder 12, a cover 19 for preventing adhesion of dust to the piston rod 13 and the like, a bump stop 20 for exerting a cushioning effect at full bounce, and a seal 21 slidably supporting the piston rod 13 at a top end of the cylinder 12. An upper spring seat 22, with which the upper end of the spring 8 is in pressed contact, is fixedly attached to the upper part of the cover 19, while a lower spring seat 23, with which the lower end of the spring 8 is in pressed contact, is fixedly attached to a vertically middle part of the cylinder 12.

Figure 3:
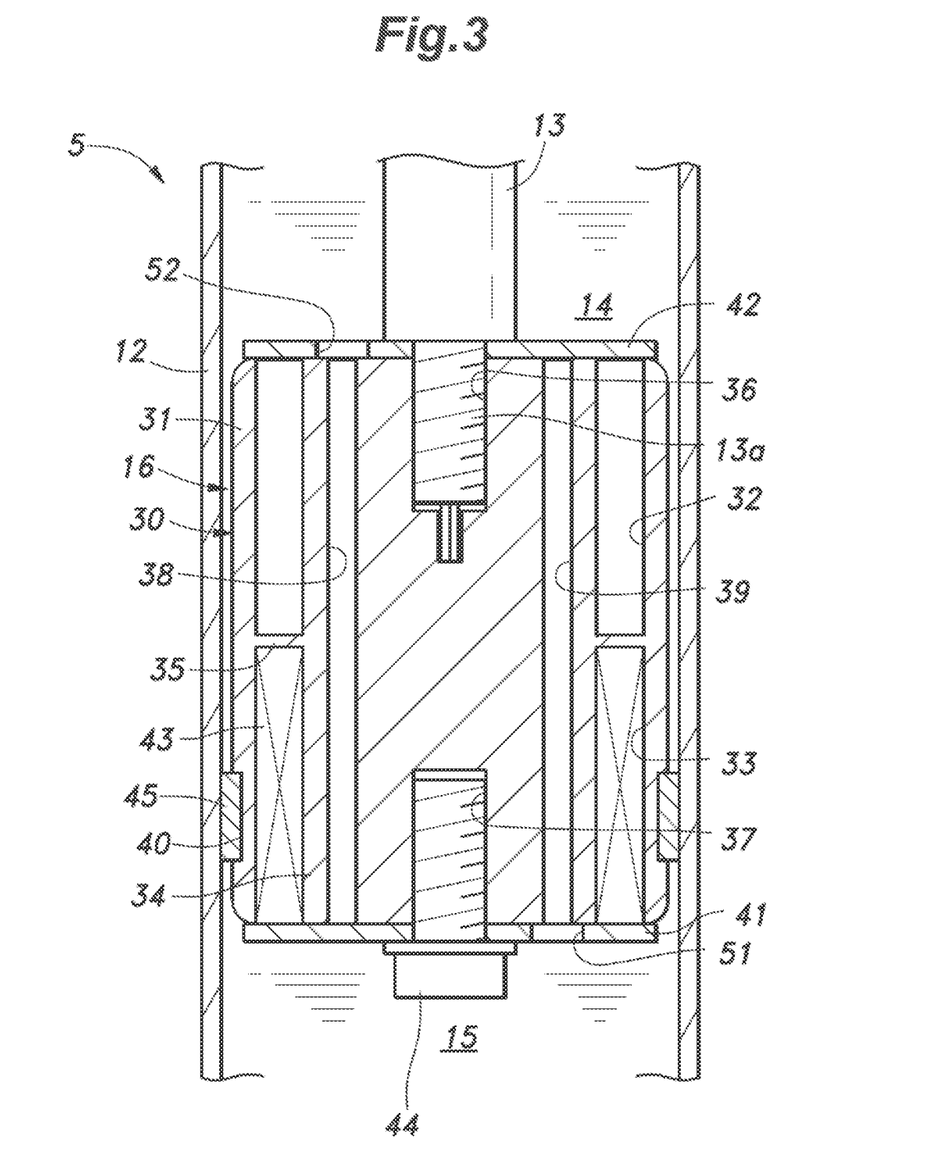
FIG. 3 is an enlarged view of a portion III in FIG. 2.
Figure 4:
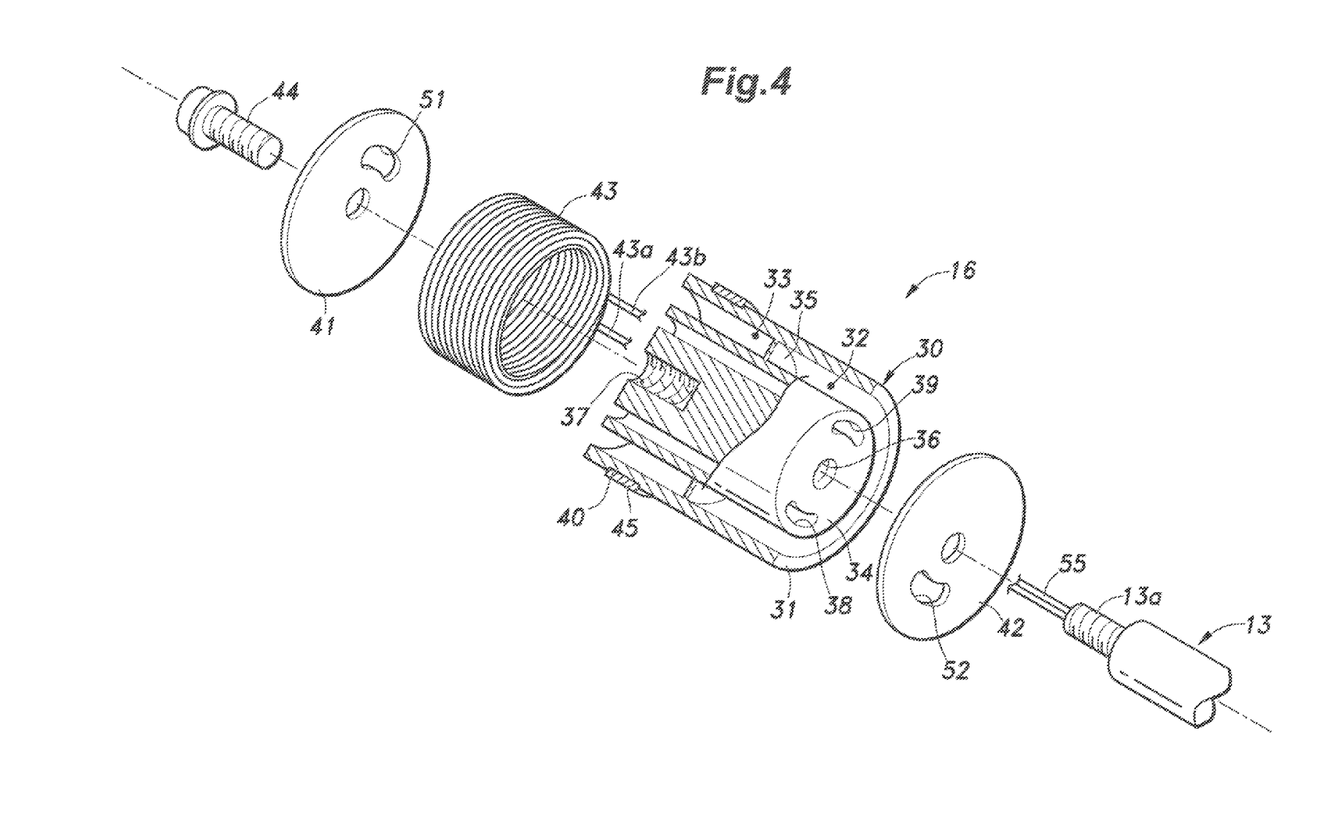
FIG. 4 is an exploded perspective view of the piston according to the exemplary embodiment.

<Piston>
With additional reference to FIGS. 3 and 4, the piston 16 is constituted of a piston main body 30, an expansion-side valve plate 41, a contraction-side valve plate 42, an electromagnetic coil 43, a bolt with a hexagonal hole (hereinafter, simply referred to as a bolt) 44, and a piston ring 45.

The piston main body 30 is an integrally formed component made of a ferromagnetic material such as a ferrite-based material by means of powder metallurgy, die casting or the like, and includes a hollow cylindrical outer yoke 31 that is coaxial with the cylinder 12, a columnar inner yoke 34 having the same axial length as that of the outer yoke 31 and disposed coaxially with the outer yoke 31 such that an outer peripheral surface of the inner yoke 34 opposes an inner peripheral surface of the outer yoke 31 via a first gap 32 and a second gap 33, and an annular connection member 35 that connects the outer yoke 31 and the inner yoke 34 with each other at an axially middle part of the piston 16 and separates the first and second gaps 32 and 33 from each other. The inner yoke 34 includes upper and lower portions having respective female threaded bores 36, 37 formed on the axis thereof such that a male threaded portion 13a of the piston rod 13 and the bolt 44 are threadably engaged with the bores 36, 37, respectively. Further, the inner yoke 34 is formed with an expansion-side communication oil passage 38 and a contraction-side communication oil passage 39, each extending through the inner yoke 34 in the axial direction. Similarly to a piston of an internal combustion engine, the piston ring 45 consists of an annular member having an end gap (not shown in the drawings), and is fitted in a retaining groove 40 formed in a lower part of the outer yoke 31 such that the piston ring 45 is in slidable contact with the inner peripheral surface of the cylinder 12.

The expansion-side valve plate 41 is a disk-shaped member obtained by stamping a sheet of a ferromagnetic material having elasticity. The valve plate 41 has a through hole 51 at a position aligned with the contraction-side communication oil passage 39, and is fastened to the under surface of the piston main body 30 by the bolt 44. Similarly to the expansion-side valve plate 41, the contraction-side valve plate 42 also is a disk-shaped member obtained by stamping a sheet of a ferromagnetic material having elasticity. The contraction-side valve plate 42 has a through hole 52 at a position aligned with the expansion-side communication oil passage 38, and is fastened to top surface of the piston main body 30 by the piston rod 13 (male threaded portion 13a). In this exemplary embodiment, each of the expansion-side valve plate 41 and the contraction-side valve plate 42 is configured to have a thickness significantly larger than the thickness of the connection member 35.

The electromagnetic coil 43 is fitted in the second gap 33 positioned at a lower part of the piston main body 30, and has lead wires 43a, 43b connected with power supply lines 55 arranged along the axis of the piston rod 13. The power supply lines 55 supply electric power from an ECU, which may be disposed in the passenger compartment or the like of the automobile, to the electromagnetic coil 43. Though not shown in the drawings, the connection between the lead wires 43a, 43b and the power supply lines 55 is made in the first gap 32.

<<Mode of Operation of the Exemplary Embodiment>>

As the automobile starts traveling, the ECU sets a target damping force of the damper 5 based on accelerations of the vehicle body obtained by a forward/rearward G sensor, a lateral G sensor and an upward/downward G sensor, a vehicle body speed input from a vehicle speed sensor, a rotation speed of each wheel obtained by a wheel speed sensor, etc., and supplies the electromagnetic coil 43 with drive current (excitation current). Consequently, as shown by broken lines in FIG. 5, the magnetic flux generated by the electromagnetic coil 43 reaches the ends of the outer yoke 31 and the inner yoke 34, whereby the expansion-side valve plate 41 and the contraction-side valve plate 42 are attracted by magnetic force.

Figure 5:
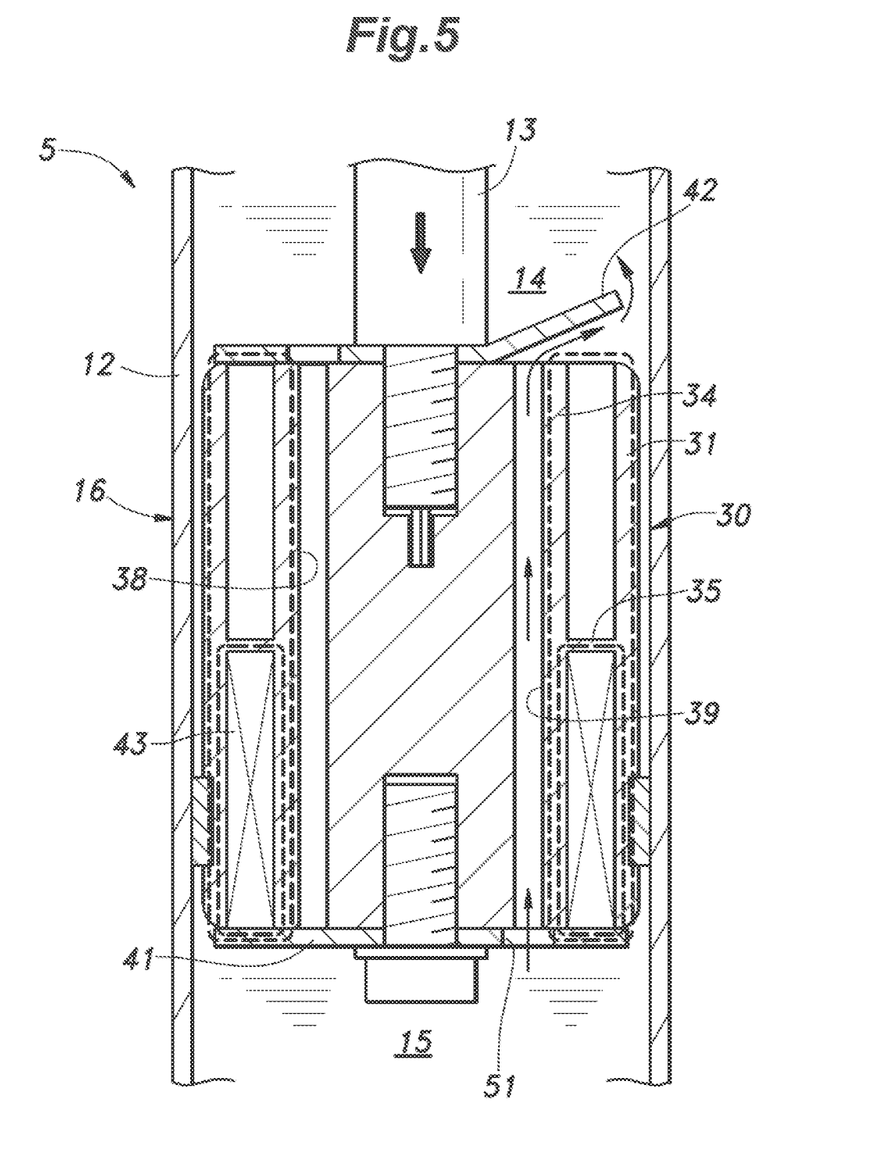
FIG. 5 is an enlarged fragmentary cross-sectional view showing a mode of operation of the damper according to the exemplary embodiment.

In this exemplary embodiment, the electromagnetic coil 43 is located at a position close to the expansion-side valve plate 41, and thus, the expansion-side valve plate 41 is magnetically attracted to the bottom end surface of the piston main body 30 with an attraction force larger than that attracting the contraction-side valve plate 42, and also, the attraction force (namely, expansion-side damping force) can be controlled in a larger control range. Further, though part of the magnetic flux generated by the electromagnetic coil 43 passes through the connection member 35, a large part of the magnetic flux on the side of the upper end of the piston main body 30 reaches the contraction-side valve plate 42 because the thickness of the connection member 35 is smaller than the thickness of the contraction-side valve plate 42, and therefore, the contraction-side valve plate 42 also is magnetically attracted with a relatively strong attraction force. In such a structure, when a telescopic action of the damper 5 causes the hydraulic oil to move through the expansion-side communication oil passage 38 or the contraction-side communication oil passage 39, the expansion-side valve plate 41 or the contraction-side valve plate 42 produces a flow resistance against the hydraulic oil, thereby generating a desired damping force. It is to be noted that FIG. 5 shows a mode of operation of the damper 5 during contraction.

On the other hand, when the automobile is traveling on a rough road or makes a turn, a large lateral force or bending force may be applied to the damper 5. In the illustrated piston main body 30, relative displacement between the outer yoke 31 and the inner yoke 34, which are connected with each other by the connection member 35, is restrained (displacement between the axis of the outer yoke 31 and the axis of the inner yoke 34 is restrained), and thus, the shape of the first and second gaps 32, 33 is prevented from changing substantially. Thereby, a smooth telescopic action of the damper 5 is enabled, wear of the seal 21, which is provided in the upper end of the cylinder 12 such that the piston rod 13 is in slidable contact therewith, is suppressed, and wire break or the like in the electromagnetic coil 43 caused by compressive deformation thereof can be avoided effectively.

Next, with reference to FIGS. 6 to 10, modifications of the foregoing exemplary embodiment will be described. In these modified embodiments, the overall structure of the damper 5 is the same as that in the foregoing exemplary embodiment, and therefore, same members or parts are denoted by same reference numerals and redundant description will be omitted.

<First Modified Embodiment>

Figure 6:
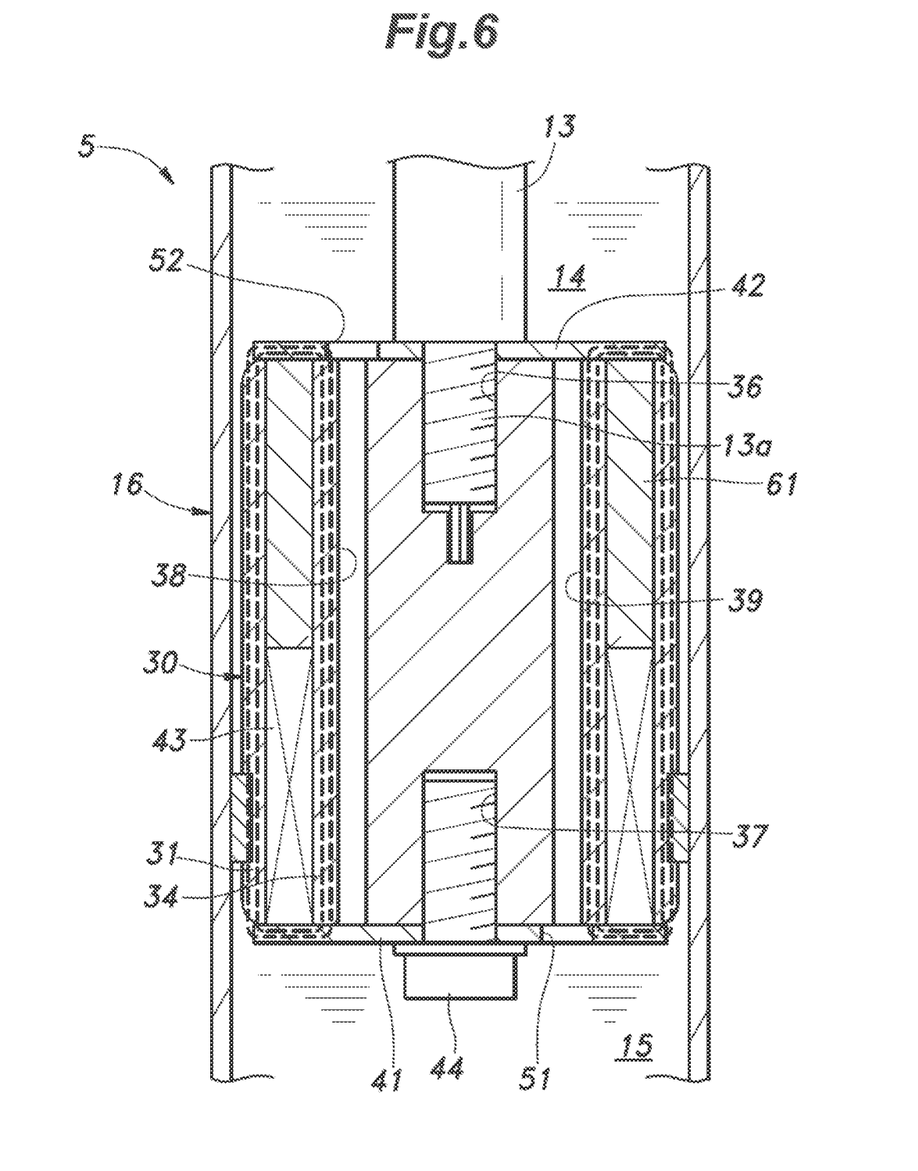
FIG. 6 is an enlarged fragmentary cross-sectional view showing a first modified embodiment.

As shown in FIG. 6, in the piston 16 according to the first modified embodiment, the hollow cylindrical outer yoke 31 and the columnar inner yoke 34 are separately formed of a ferromagnetic material, and these yokes 31 and 34 are connected with each other by a hollow cylindrical connection member 61 made of a non-magnetic material (such as austenitic stainless steel or aluminum alloy). The connection member 61 is inserted between the outer yoke 31 and the inner yoke 34 and is secured to these yokes 31 and 34 by means of press-fitting, welding, adhesion or the like. In the first modified embodiment, a connection member made of a ferromagnetic material as shown in the exemplary embodiment is not included, and thus, the magnetic flux generated by the electromagnetic coil 43 acts upon the valve plates 41, 42 without leaking out in the middle, as shown by broken lines in FIG. 6. Further, the connection member 61 has a much larger axial size than the connection member in the exemplary embodiment, and therefore restrains relative displacement between the outer yoke 31 and the inner yoke 34 more effectively.

<Second Modified Embodiment>

Figure 7:
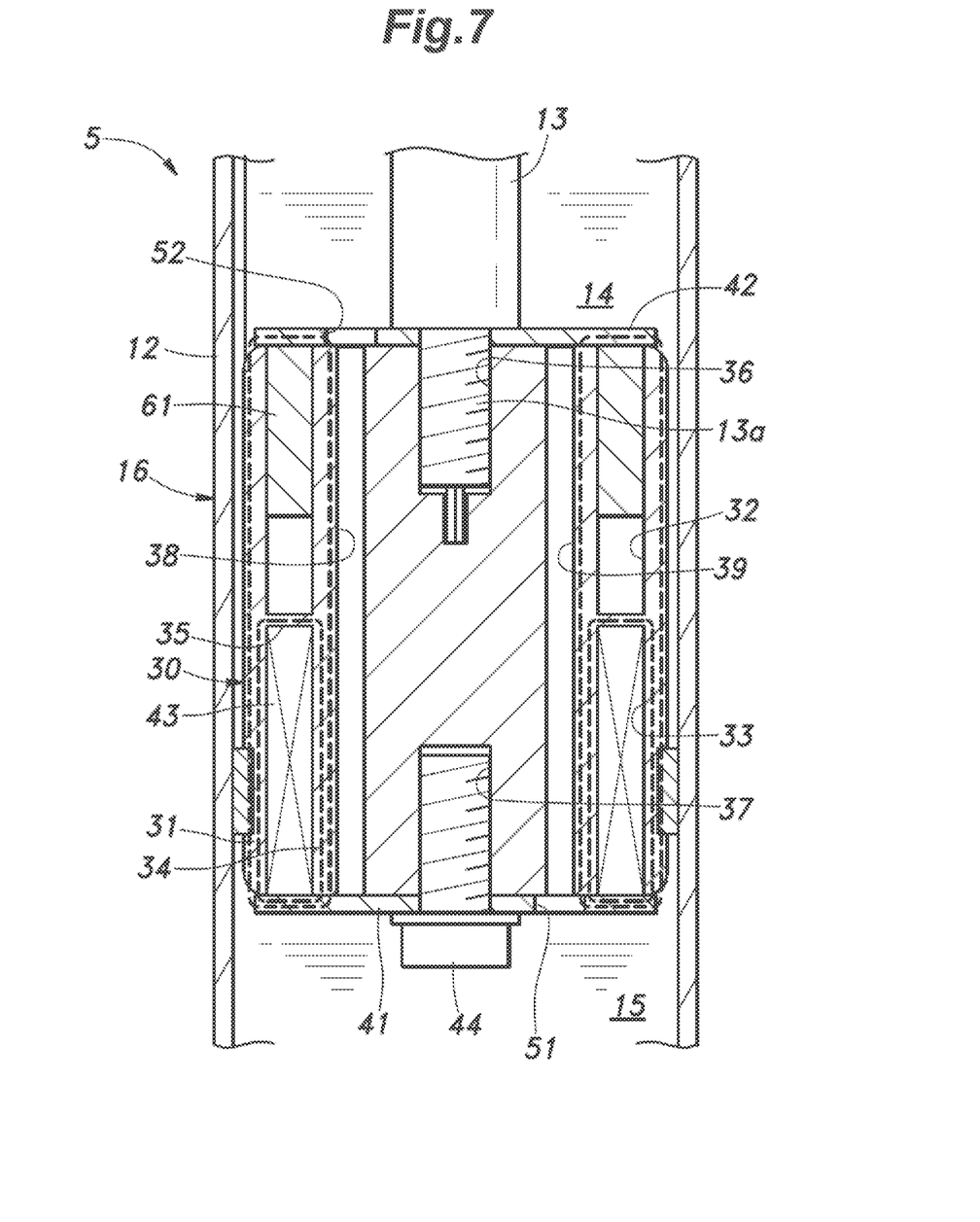
FIG. 7 is an enlarged fragmentary cross-sectional view showing a second modified embodiment.

As shown in FIG. 7, in the piston 16 according to the second modified embodiment, the outer yoke 31 and the inner yoke 34 are connected with each other by the connection member 35 as in the exemplary embodiment, but the connection member 61 made of a non-magnetic material is securely fitted in a part of the first gap 32 on the side of the contraction-side valve plate 42. The mode of operation in the second modified embodiment is substantially the same as that in the foregoing exemplary embodiment, but owing to the combination of the connection member 35 and the connection member 61, relative displacement between the outer yoke 31 and the inner yoke 34 can be restrained more effectively.

<Third Modified Embodiment>

Figure 8:
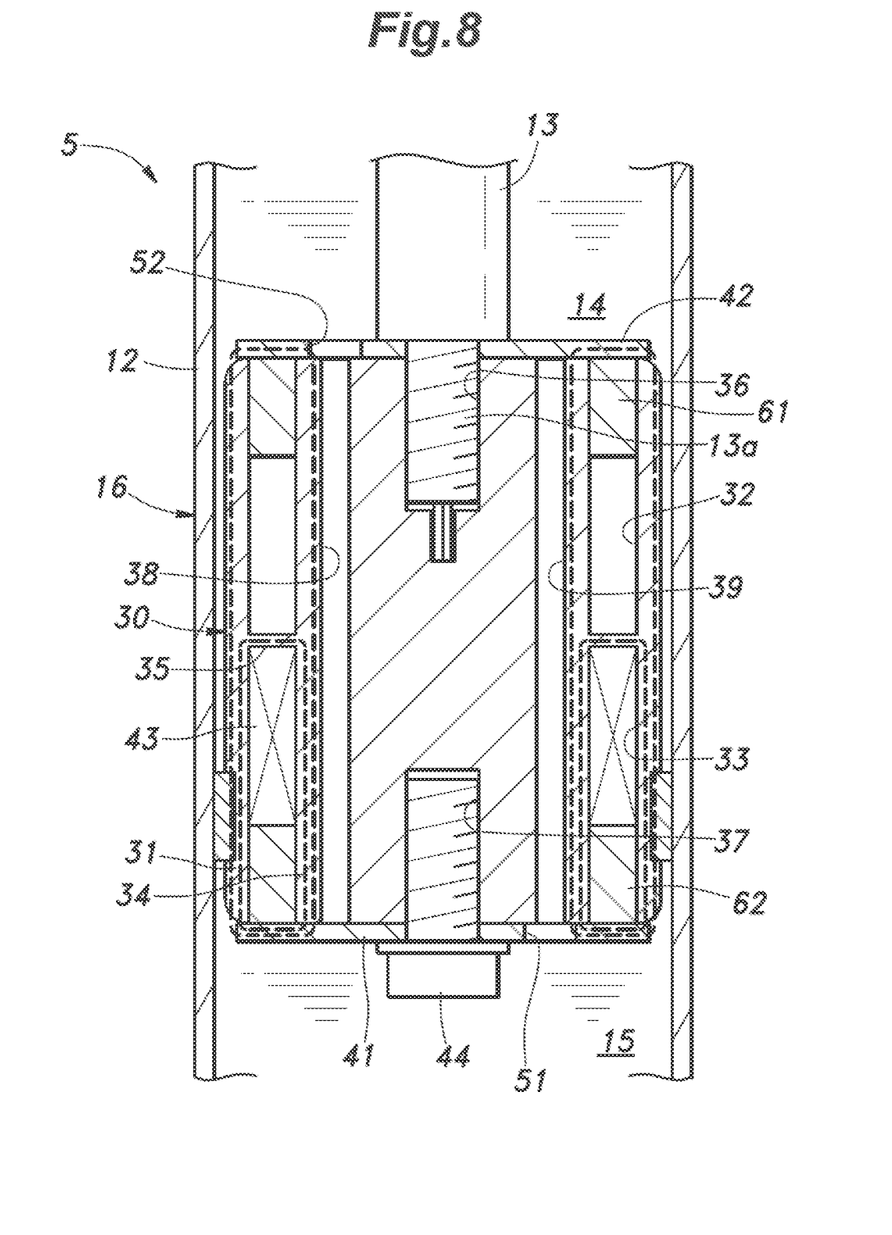
FIG. 8 is an enlarged fragmentary cross-sectional view showing a third modified embodiment.

As shown in FIG. 8, in the piston 16 according to the third modified embodiment, the outer yoke 31 and the inner yoke 34 are connected with each other by the connection member 35 as in the exemplary embodiment, but connection members 61, 62 each made of a non-magnetic material are securely fitted in a part of the first gap 32 close to the compression-side valve plate 42 and a part of the second gap 33 close to the expansion-side valve plate 41, respectively. The mode of operation in the third modified embodiment is substantially the same as that in the second modified embodiment, but relative displacement between the outer yoke 31 and the inner yoke 34 can be restrained even more effectively.

<Fourth Modified Embodiment>

Figure 9:
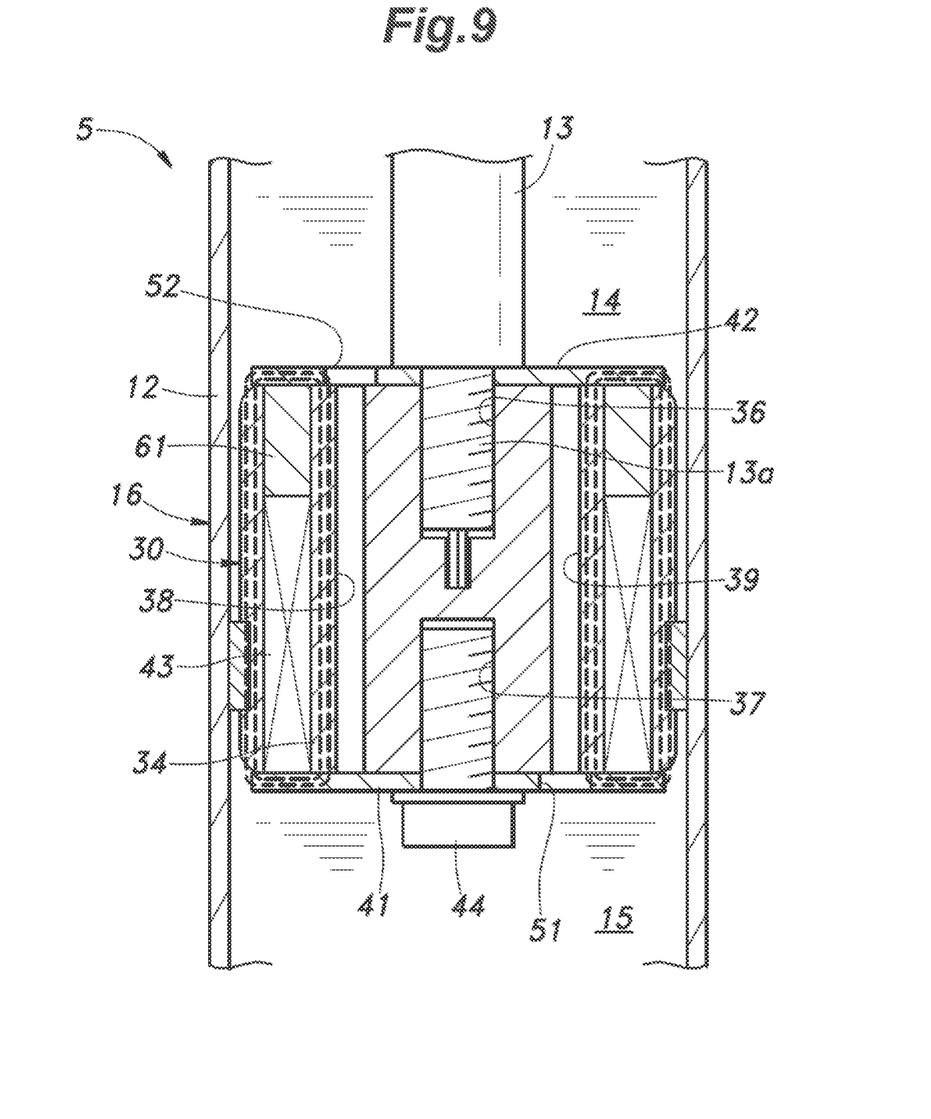
FIG. 9 is an enlarged fragmentary cross-sectional view showing a fourth modified embodiment.

As shown in FIG. 9, the piston 16 according to the fourth modified embodiment has substantially the same structure as that in the first modified embodiment, but the connection member 61 is given a shorter axial size, such that the entire length of the piston 16 is reduced. Thus, provided that the entire length of the cylinder 12 is the same, a larger telescopic stroke of the damper 5 is enabled and a greater degree of freedom in designing the suspension is achieved.

<Fifth Modified Embodiment>

Figure 10:
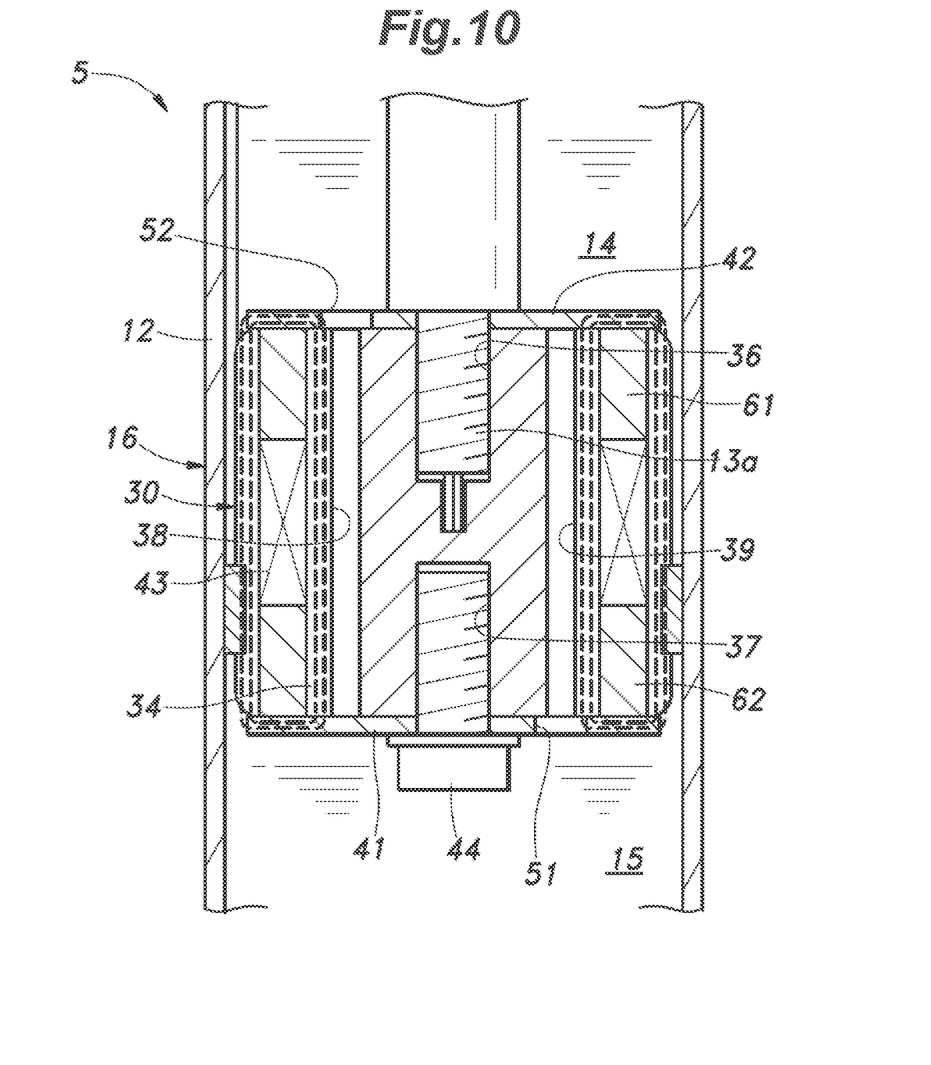
FIG. 10 is an enlarged fragmentary cross-sectional view showing a fifth modified embodiment.

As shown in FIG. 10, in the piston 16 according to the fifth modified embodiment, the electromagnetic coil 43 is disposed in an axially middle part, and connection members 61, 62 having short axial lengths are fitted in gaps on either end of the electromagnetic coil 43. In this structure, it is possible to reduce the entire length of the piston 16 as in the fourth modified embodiment. Further, the expansion-side valve plate 41 and the contraction-side valve plate 42 are magnetically attracted with a substantially same attraction force, and thus, relative displacement between the outer yoke 31 and the inner yoke 34 can be restrained more effectively.

Description of the embodiments of the present invention has been provided in the foregoing. It is to be noted, however, that the mode of the present invention is not limited to the foregoing embodiments. For example, in the foregoing embodiments, the present invention was applied to a monotube variable damping force damper for use in a McPherson strut type front suspension, but the present invention may be applied to a variable damping force damper for a font suspension of a type other than the McPherson strut type or for a rear suspension, or to a variable damping force damper of a multi-tube type, etc. Further, though the piston main body is provided with a piston ring fitted on its outer peripheral surface in the foregoing embodiments, it is possible that the piston main body be configured to directly contact the inner peripheral surface of the cylinder in a slidable manner. Furthermore, in the foregoing embodiments, each of the expansion-side valve plate and the contraction-side valve plate consists of a single plate, but the valve plate may be of a multi-plate type that is formed of a stack of circular thin plates. Besides, the concrete structure of the damper and the piston as well as the concrete shape of various parts may be modified as appropriate within the scope of the sprit of the present invention.

GLOSSARY 5 damper
12 cylinder
13 piston rod
14 rod-side oil chamber
15 piston-side oil chamber
16 piston
30 piston main body
31 outer yoke
32 first gap
33 second gap
34 inner yoke
35 connection member
38 expansion-side communication oil passage
39 contraction-side communication oil passage
41 expansion-side valve plate
42 contraction-side valve plate
43 electromagnetic coil
45 piston ring
61, 62 connection member

The invention claimed is:

1. A variable damping force damper comprising:
a hollow cylinder containing hydraulic oil sealed therein;
a columnar piston configured to reciprocate in the cylinder and separate an interior of the cylinder into a rod-side oil chamber and a piston-side oil chamber; and
a piston rod having the piston at an end thereof,
wherein the piston comprises:
an inner yoke made of a ferromagnetic material, the inner yoke being secured to the piston rod and having an outer peripheral surface coaxial with the cylinder; and
an outer yoke made of a ferromagnetic material, the outer yoke having an inner peripheral surface coaxial with the outer peripheral surface of the inner yoke and opposing the outer peripheral surface of the inner yoke via a predetermined gap,
and wherein the piston further consists of a single electromagnetic coil disposed in the gap;
and wherein the piston further comprises:
a communication oil passage having an opening in at least one of axial ends and connecting the rod-side oil chamber and the piston-side oil chamber with each other;
a valve plate configured to have elasticity and close the opening of the communication oil passage, the valve plate being made of a ferromagnetic material and attracted in a closing direction by a magnetic force of the electromagnetic coil;
an additional communication oil passage having an opening in an axial end opposite to an axial end in which the opening of the communication oil passage is provided, and connecting the rod-side oil chamber and the piston-side rod chamber with each other; and
an additional valve plate configured to have elasticity and close the opening of the additional communication oil passage, the additional valve plate being made of a ferromagnetic material and attracted in a closing direction by a magnetic force of the electromagnetic coil,
wherein the inner yoke and the outer yoke are connected with each other by a metallic connection member at a position different from that of the electromagnetic coil in an axial direction, the connection member being made of a ferromagnetic material and connecting the inner yoke and the outer yoke at an axially intermediate position of the inner yoke and the outer yoke.

2. The variable damping force damper according to claim 1, wherein the electromagnetic coil is offset toward one of the valve plates relative to an axially middle position between the valve plates.

3. The variable damping force damper according to claim 1, wherein the connection member is provided integrally with the inner yoke and the outer yoke.

4. The variable damping force damper according to claim 1, wherein:
- a piston ring is fitted on the outer yoke so as to be in slidable contact with the inner peripheral surface of the cylinder; and
- the connection member is disposed at a position spaced from the piston ring in the axial direction.

* * * * *